United States Patent
Howes et al.

Patent Number: 6,113,533
Date of Patent: Sep. 5, 2000

[54] ENDOSCOPE VIDEO ADAPTER WITH ZOOM

[75] Inventors: Allen R. Howes, San Ramon; Shifang Li, Pleasanton, both of Calif.

[73] Assignee: Transamerica Technologies International, San Ramon, Calif.

[21] Appl. No.: 08/988,502

[22] Filed: Dec. 10, 1997

[51] Int. Cl.[7] .................................................. A61B 1/04
[52] U.S. Cl. .......................... 600/112; 600/167; 359/685
[58] Field of Search .................................. 600/112, 160, 600/163, 167, 168, 172; 359/676, 677, 682, 684, 685, 704

[56] References Cited

U.S. PATENT DOCUMENTS

| | | | |
|---|---|---|---|
| 3,906,529 | 9/1975 | Fillipovich | 359/704 |
| 4,196,990 | 4/1980 | Forsyth . | |
| 4,621,283 | 11/1986 | Feinbloom | 600/168 |
| 4,781,448 | 11/1988 | Chatenever | 350/429 |
| 4,844,071 | 7/1989 | Chen | 600/163 |
| 4,862,199 | 8/1989 | Centkowki | 354/62 |
| 4,969,450 | 11/1990 | Chinnock | 600/163 |
| 5,056,902 | 10/1991 | Chinnock | 600/112 |
| 5,078,503 | 1/1992 | Ueda | 359/823 |
| 5,101,807 | 4/1992 | Kawashima | 600/112 |
| 5,125,394 | 6/1992 | Chatenever | 600/112 |
| 5,156,141 | 10/1992 | Krebs | 600/112 |
| 5,169,568 | 12/1992 | Ainger | 600/163 |
| 5,179,934 | 1/1993 | Nagayoshi | 600/167 |
| 5,194,992 | 3/1993 | Atsuta | 359/704 |
| 5,222,482 | 6/1993 | Clark | 600/168 |
| 5,245,475 | 9/1993 | Takasugi | 359/690 |
| 5,418,645 | 5/1995 | Coath | 359/676 |
| 5,496,261 | 3/1996 | Sander | 600/112 |
| 5,575,757 | 11/1996 | Kennedy | 359/700 |
| 5,591,119 | 1/1997 | Adair | 600/112 |
| 5,760,971 | 6/1998 | Inadome | 359/676 |
| 5,798,871 | 8/1998 | Shibayama et al. | 359/684 |

*Primary Examiner*—John P. Leubecker
*Attorney, Agent, or Firm*—Townsend and Townsend and Crew LLP.

[57] ABSTRACT

An adaptor for coupling a video camera to an endoscope, borescope, or the like includes a focusing mechanism and an independent zoom or magnification variation adjustment mechanism. The zoom mechanism will move two lens groups along an optical path simultaneously, but at different speeds. Each lens groups preferably includes a pair of lenses affixed together as a doublet. By controlling the position of the doublets relative to a pair of focusing lenses, the present adaptor provides an optically compensated zoom mechanism which allows changes in the magnification of the adaptor throughout a wide magnification range without having to refocus the adaptor.

14 Claims, 3 Drawing Sheets

ENDOSCOPE VIDEO ADAPTER WITH ZOOM

BACKGROUND OF THE INVENTION

1. Field of the Invention

This invention relates generally to optical imaging devices and methods, and more particularly, provides an adaptor for coupling a video camera to an optical viewing device such as an endoscope, a borescope, or the like, especially for viewing and documenting images from within a patient body.

Endoscopes are often used by physicians to view internal tissues of a patient body. Traditionally, physicians have observed internal body tissues through an eye piece of the endoscope. Although this allows physicians to diagnose and optically direct therapies of these internal tissues, increasingly complex minimally invasive internal surgical procedures have recently been developed, resulting in physicians viewing internal tissues through endoscopes for an extending period of time.

Adaptors have recently become available which attach endoscopes to video cameras, thereby allowing physicians to view images of the internal body tissues on a standard viewing screen. This can significantly increase the comfort of the physician during the procedure, improving both efficiency and safety of endoscopically directed minimally invasive surgical procedures. These adaptors also facilitate documenting the images of the internal tissues (and internal surgical procedures) for future reference.

One disadvantage of known endoscopic video adaptors is that it is often difficult to change the magnification of the video image during the procedure. For example, in laparoscopic cholecystectomy it is generally desirable to begin the surgical procedure while viewing a video image which is at quite low magnification. Low magnification presents a wide, panoramic view of the surgical area, and thereby facilitates optically directing the safe introduction of the various trocars and other instruments which will be cholecystectomy. However, as the cholecystectomy procedure continues, it would be desirable to increase the magnification. More specifically, the surgeon will generally desire a closer, more detailed view when dissecting the cystic artery, dissecting the cystic duct, and when introducing the cholangiogram catheter into the cystic duct. To provide such detailed viewing, quite high magnification of the video image would be desirable. Furthermore, when dissecting the gall bladder from the liver bed, it would be desirable for the surgeon to operate while viewing a video image at a mid-range magnification. In other words, it is generally advantageous to allow a physician to operate at a variety of magnifications during the course of a single surgical procedure. Also, a wide variety of endoscopes with different view angles are used in various surgical procedures. Each scope, however, is required to have a video adaptor with a specific magnification for the video camera to be used. What is necessary, therefore, is a universal zoom video adaptor which can accommodate all endoscope view angles and any camera of choice.

Many video adaptors now being used with endoscopes are restricted to a single magnification level, the adaptors often having a fixed field of view. Video adaptors having some zoom capabilities are available commercially. Unfortunately, these commercially available zoom video adaptors generally require refocusing of the video image each time the magnification has changed. This increases the amount of time required for an endoscopically directed procedure, and can substantially increase patient risk, particularly during the time period the image is out of focus.

To overcome these disadvantages, it would be desirable to provide improved devices for coupling a video camera and/or video system to an endoscopy, borescope, or the like.

2. Description of the Background Art

U.S. Pat. No. 4,862,199 describes an adjustable adaptor for a borescope and a film/video camera. A zoom lens adaptor for an endoscopic camera is described in U.S. Pat. No. 4,781,448. An endoscopic zoom lens is described in U.S. Pat. No. 5,418,645. Optical systems for endoscopes are also described in U.S. Pat. Nos. 5,245,745 and 5,575,757.

An eye piece mechanism for an endoscope is described in U.S. Pat. No. 5,078,503. A lens mount assembly is described in U.S. Pat. No. 5,194,992, while a zoom lens mechanism is described in U.S. Pat. No. 3,906,529. A zoom image coupler is commercially available from Precision Optics Corporation of Gardner, Mass.

SUMMARY OF THE INVENTION

The present invention provides an improved adaptor for coupling a video camera to an endoscope, borescope, or the like. The adaptors of the present invention will generally include a focusing mechanism and an independent "zoom" or magnification variation adjustment mechanism. The zoom mechanism will preferably move two lens assemblies simultaneously, but at different speeds. Each lens assembly preferably includes a pair of lenses affixed together in a doublet. By carefully controlling the position of the doublets relative to a pair of focusing lenses, the present invention can provide an optically compensated zoom mechanism which allows changes in the magnification of the adaptor throughout a wide magnification range without having to refocus the adaptor.

The present invention provides a device for coupling a video camera to an endoscope or a borescope for recording and displaying images from within a patient body. The device comprises a clamp to attach the device to the endoscope or borescope. A mount attaches the device to the video camera. A lens system is disposed in an optical path between the clamp and the mount. The lens system includes a focusing and a zoom lens assemblies which are movable along the optical path. The focusing lens assembly relays the image from the attached scope to a fixed position and varies an object distance of the images. The zoom lens assembly further relays the image onto the camera.

The focusing lens assembly includes a focusing mechanism and two lens groups. The focusing mechanism moves one lens group relative to the other to relay the images from the attached scope to a fixed position. One of the lens group in the focusing assembly is stationary to keep the system simple. The zoom lens assembly includes a zoom mechanism and two lens groups. The zoom mechanism moves the two lens groups along the optical path so that the images transmitted along the optical path vary in magnification within a zoom range. The zoom mechanism moves the two lens groups in unison so that the images position remains substantially constant when the zoom mechanism varies the magnification throughout the zoom range.

Generally, the zoom mechanism will move the lens groups in unison when a zoom actuation handle rotates. This allows an effective focal length (EFL) of the device to be varied continuously from about 22.5 mm to about 50 mm. Preferably, each lens group will include a pair of lenses affixed together as a doublet. On the other hand, each lens group of the focusing assembly (which is adjustable independently of the zoom mechanism) may be provided having a single lens. Hence, the present invention can provide a simple zoom adaptor including only six non-planar optical elements with three moving groups. One of the moving groups focusing the images, and the other two moving groups change the magnification without moving the image position.

In a first aspect, the present invention provides a device for coupling a video camera to an endoscope or a borescope for recording and displaying images. The device comprises a clamp adapted to attach the device to the endoscope or borescope. A mount is adapted to attach the device to the video camera. A lens system is disposed in an optical path between the clamp and the mount. The lens system includes first and second lens groups which are moveable along the optical path. A zoom mechanism is coupled to the lens groups. The zoom mechanism is adapted to move the first and second lens groups along the optical path so that the images transmitted along the optical path vary in magnification within a zoom range. The zoom mechanism is also adapted so that an image position remains substantially constant when the zoom mechanism varies the magnification throughout the zoom range.

In another aspect, the present invention provides an adaptor for coupling a video camera with an endoscope to record images from within a patient body. The adaptor comprises a clamp adapted to attach the adaptor to the endoscope. A mount is adapted to attach the adaptor to the video camera. A focus system includes moveable and fixed focus lenses, and is disposed in an optical path from the clamp to the mount. A focus mechanism is coupled to the moveable focus lens so as to move the moveable lens and vary an object distance of the images. A first lens assembly is disposed in the optical path from the focus system. A second lens assembly is disposed in the optical path from the first lens unit. A zoom mechanism is coupled to the lens assemblies and is adapted to move the lens units along the optical path to vary magnification of the images without varying the object distance.

DETAILED DESCRIPTION OF THE SPECIFIC EMBODIMENTS

Figure 1:
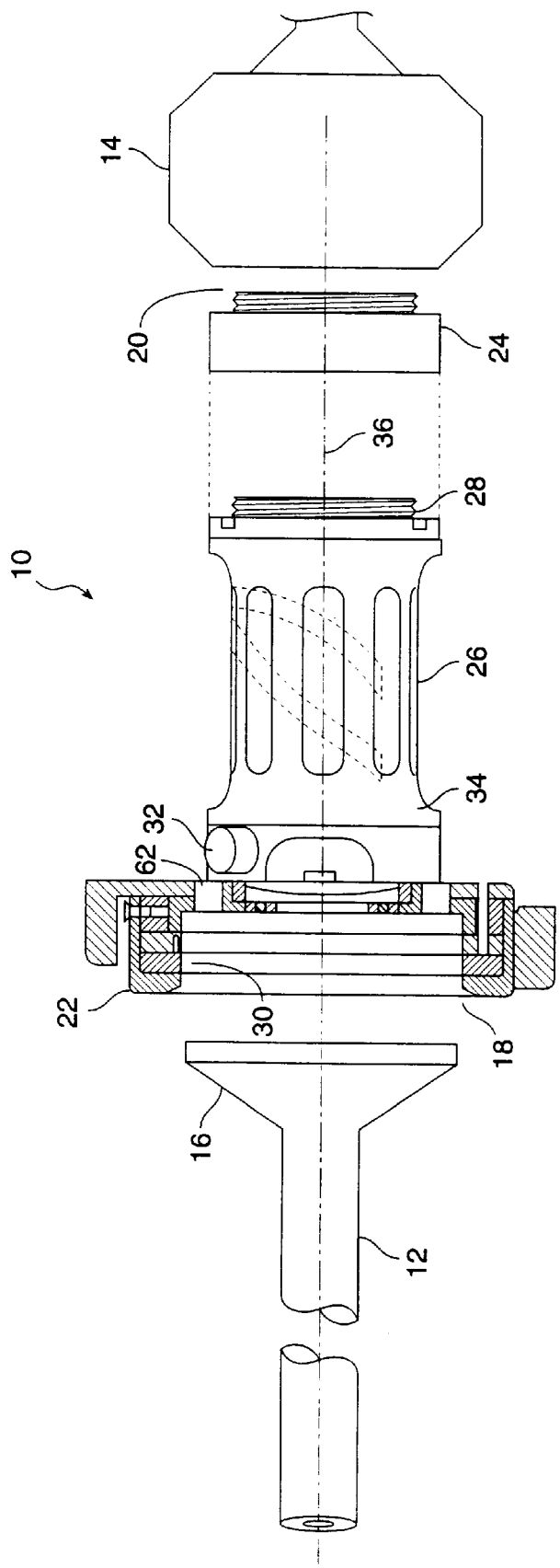
FIG. 1 is an exploded side view in partial cross-section showing the structure and use of the adaptor of the present invention for coupling an endoscope to a video camera.

Referring now to FIG. 1, an adaptor 10 couples an endoscope 12 with a video camera 14 so that images normally viewed through an eye piece 16 are directed to the sensor of the camera. Generally, adaptor 10 has an input end 18 and an output end 20. A clamp 22 adjacent input end 18 affixes adaptor 10 to eye piece 16 of endoscope 12. A mount 24 adjacent output end 20 is used to affix the adaptor to the video camera 14.

Clamp 22 and mount 24 will preferably accommodate common endoscopic eye piece structures and camera mount receivers, and adaptor 10 will often be available with a variety of clamp and mount structures. To facilitate the use of differing mounts, mount 24 may be affixed to an adaptor body 26 using threads 28, mount 24 often accommodating a V-mount, a bayonet mount, a C-mount, and/or any other proprietary or standard camera mount structure. Clamp 22 will often include a resilient torroidal clamping body 30 which is compressed to affix eye piece 16 to adaptor 10. A wide variety of alternative clamping structures may also be used. In some embodiments, where endoscope 12 is adapted for directly coupling the endoscope to other optical components, clamp 22 may comprise any of the standard or proprietary lens mounting structures described with reference to mount 24, within the scope of the present invention.

Adaptor body 26 contains the optical components of the focusing and zoom assemblies of adaptor 10. Focusing is effected by rotation of knob 32, while changes in magnification are effected by rotation of outer tube 34 about the axis 36 of adaptor 10. Adaptor body 26 will generally include a water-tight housing, and the housing and optical components therein will be adapted to withstand cold-soak sterilization.

Figure 2:
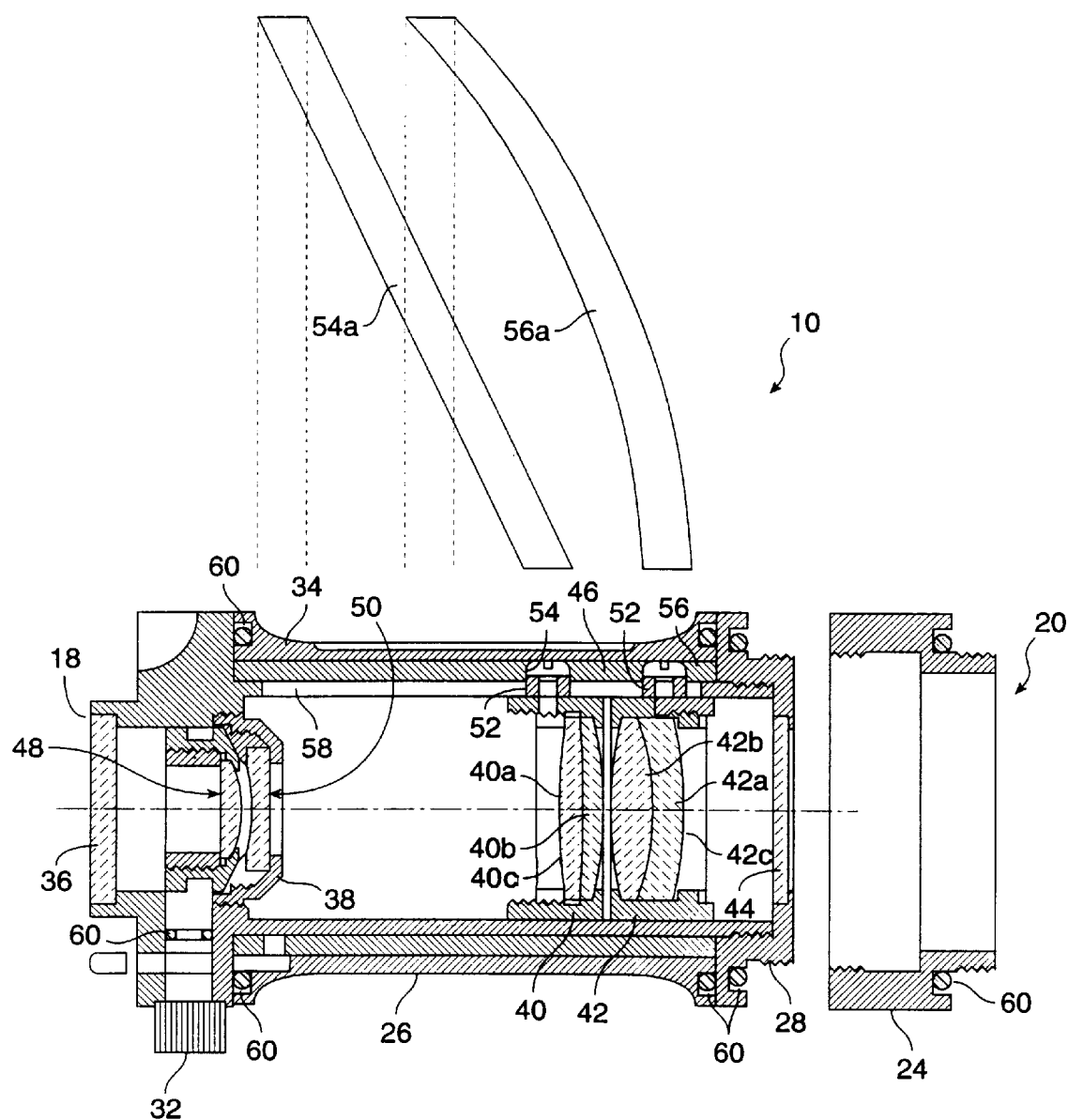
FIG. 2 is a cross-sectional side view showing the active optical elements of the zoom adaptor of FIG. 1, and also schematically illustrates a cam-and-follower mechanism for positioning the optical elements to vary magnification without changing an object distance.

The optical elements and actuation mechanisms of adaptor 10 are illustrated more clearly in FIG. 2. Beginning at input end 18, light rays from the endoscope will enter adaptor body 26 through a planar glass window 36. The light rays are first diverging using a focus assembly 38 to form a virtual image. The virtual image is then directed through first and second lens groups 40, 42 before exiting adaptor 10 through an output planar window 44. First and second lens groups 40, 42, together with a zoom mechanism 46, define an optically compensated zoom system which focuses the light rays from the focus assembly to provide a variable magnification image on the CCD sensor of the video camera.

Focusing assembly 38 includes a moveable lens 48 and a fixed lens 50. These lenses will preferably comprise positively and negatively powered lenses, respectively. Moveable lens 48 will ideally have an effective focal length of 16.93 mm, while fixed lens 50 will have an effective focal length of 10.58 mm. Moveable lens 48 is moved by rotating focus adjustment 32 having an eccentric pin, as illustrated.

First lens group 40 includes a pair of lenses 40a, 40b which are cemented together to form a doublet 40c. Similarly, second lens group 42 includes first and second lenses 42a, 42b which are cemented together to define a doublet 42c. In the exemplary embodiment, first doublet 40c has an effective focal length of 59.15 mm, while second doublet 42c has an effective focal length of 50.42 mm. These two doublets move in unison as guided by zoom mechanism 46.

Zoom mechanism 46 makes use of pins 52 which extend from each of the zoom lens assemblies. More specifically, pin 52 extending from first doublet assembly 40 rides in a first slot 54, while the pin extending from the second doublet assembly 42 rides in a second slot 56. Slots 54 and 56 extend roughly helically about adaptor body 26, and rotate about the axis of the adaptor with outer tube 34. Planar projections of the slots are illustrated as first planar slot 54a and second planar slot 56a in FIG. 2. An axial slot 58 restrains the radial position of pins 52 when outer tube 34 rotates, so that first and second doublet assemblies 40, 42 move axially within the lens body in precise relationship. When the distance between the two doublet assemblies 40, 42 is changed, the EFL of the zoom assembly 26 varies. This change in EFL results in an image magnification change. The common motion of the two doublet assemblies compensate for the change in position. As a result, the image remains in a constant focal plane when the magnification changes. O-rings 60 disposed between the individual housing and adjustment components of adaptor body 26 ensure that the adaptor is sufficiently watertight to withstand cold-soak sterilization.

Figure 3:
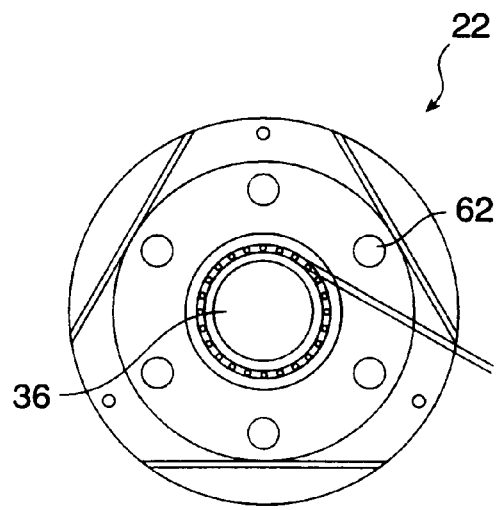
FIG. 3 illustrates an end view of a clamp for affixing the adaptor of FIG. 1 to an eye piece of an endoscope.

Referring now to FIG. 3, a series of vents 62 allow air to flow from the surrounding environment to the space between input window 36 and eye piece 16, thereby minimizing fogging of the eye piece during use.

Figure 4:
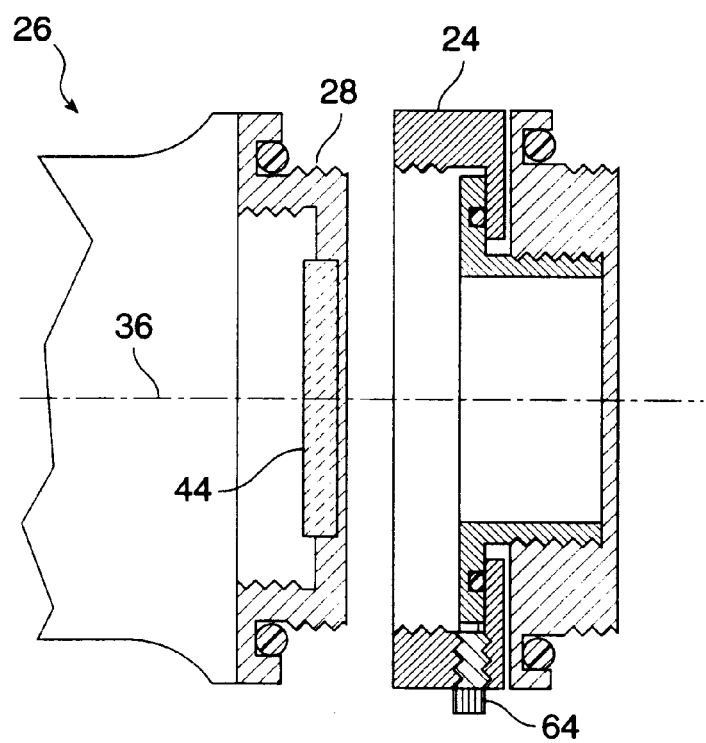
FIG. 4 is a partial cross-sectional view of a camera mount of the adaptor of FIG. 1 for coupling the adaptor to a video camera, in which the mount includes a centering mechanism for centering the image, according to the principles of the present invention.

Referring now to FIG. 4, camera mount 24 will preferably include horizontal adjustment screws 64 for centering of the image. Rotation of adjustment screw 64 will translate adaptor body 26 laterally relative to the video camera. Typically, two orthogonal alignment screws will be provided about the axis 36 of the adaptor to adjust the location of the image on the video screen both vertically and horizontally.

When using adaptor 10 for imaging the internal tissues of a patient body, endoscope 12 may optionally be positioned prior to attaching the adaptor to the scope. Alternatively, the endoscope, adaptor, and video camera may be affixed together during positioning of the scope. Regardless, adaptor 10 will be affixed to eye piece 16 of scope 12 by compressing clamping body 30, generally using a quick-release clamp actuator.

Mount 24 will often be selected from among a variety of mount structures so as to be suitable for the mount receiver of video camera 14. Mount 24 will then be affixed to adaptor body 26 using threads 28. Once the mount is attached to video camera 14 and the clamp is affixed to eye piece 16 of endoscope 12, adaptor 10 is ready to transmit images from the endoscope to the camera.

Prior to focusing the image, outer tube 34 is rotated to move the first and second lens assemblies to a position providing a high degree of magnification. This helps to ensure that the focus is sufficiently accurate throughout the magnification range. Next, focus adjustment 32 is rotated until the image provided through video camera 14 is sharp and clear. Preferably, the focus system will be capable of adjusting for object distances measured from the adaptor, throughout the range of from about 10 inches to about 20 inches, and ideally from about 10 inches to infinity.

Once endoscope 12 is positioned and the focus system has been adjusted, tissues which remain at a fixed distance from the distal end of scope 12 will remain in focus while the zoom control mechanism varies the magnification provided through adaptor 10 throughout the zoom range. Therefore, the physician is free to adjust the degree of magnification as required, and need not refocus the adaptor after each change in magnification. Tissues will also remain in focus during changes in magnification.

To effect changes in magnification, outer tube 34 is rotated about the axis 36 of adaptor 10. Rotation of outer tube 34 can allow the surgeon to move from a low magnification and a wide field of view, such as during introduction of laparoscopic instruments to the surgical site, to an increased magnification giving view of greater detail. Throughout these changes, focus need not be adjusted, thereby allowing the surgeon to view the tissues without interruption substantially throughout the procedure. If endoscope 12 is repositioned, or if the tissues are moved relative to the distal end of the scope, refocusing can easily be provided by adjusting the focusing system.

While the exemplary embodiment has been described in some detail, for purposes of clarity of understanding and by way of example, a variety of changes, modifications, and adaptations will be obvious to those who skill in the art. Therefore, the scope of the present invention is limited solely by the appended claims.

What is claimed is:

1. A device for coupling a video camera to an endoscope or borescope for recording and displaying images, the device comprising:

a clamp adapted to attach the device to the endoscope or borescope;

a plurality of separate mounts adapted releasably to attach the device to different video cameras so that a suitable mount can be selected from the plurality of mounts to couple a mount receiver of the camera to the device;

a lens system disposed in an optical path between the clamp and the mount, the lens system comprising first and second positive lens groups which are movable along the optical path;

a zoom actuation handle;

a zoom mechanism coupling the zoom actuation handle to the first and second lens groups, the zoom mechanism adapted to move the first and second lens groups simultaneously and in the same direction along the optical path in particular relationship relative to each other when the zoom actuation handle moves throughout a handle movement range so that the images transmitted along the optical path vary in magnification within a zoom range, and so that an image position remains substantially constant when the zoom mechanism varies magnification throughout the zoom range; and wherein the lens system further comprises a focusing lens group, comprising a movable and a fixed lens, and further comprising a focus mechanism which moves the movable lens along the optical path to vary the object distance, the focus mechanism being movable independently of the magnification of the images.

2. The device of claim 1, wherein the zoom range extends from an effective focal length (EFL) of about 22.5 mm to about 50 mm.

3. The device of claim 1, wherein the focusing lens group can focus the images throughout an object distance range from at least about 10 inches to infinity.

4. A device as claimed in claim 1, further comprising a centering mechanism coupled to at least one of the mount and the clamp, the centering mechanism adapted to displace the optical path laterally to center the image relative to an image sensor of the video camera.

5. The device of claim 1, wherein the first and the second lens groups and the focusing lens group together define no more than six optical elements.

6. A device for coupling a video camera to an endoscope or borescope for recording and displaying images, the device comprising:

a clamp adapted to attach the device to the endoscope or borescope;

a plurality of separate mounts adapted releasably to attach the device to different video cameras so that a suitable mount can be selected from the plurality of mounts to couple a mount receiver of the camera to the device;

a lens system disposed in an optical path between the clamp and the mount, the lens system comprising first and second lens groups which are movable along the optical path;

a focusing lens group, comprising a movable lens and a fixed lens, and a focus mechanism, the focus mechanism moving the movable lens along the optical path to vary the object distance, the focus mechanism being movable independently of the magnification of the images; and a zoom mechanism adapted to move the first and second lens groups along the optical path so that the images transmitted along the optical path vary in magnification within a zoom range, and so that an image position remains substantially constant when the zoom mechanism varies magnification throughout the zoom range; the first and second lens groups being positive cemented doublets in the optical path from the focusing lens group, and wherein the zoom mechanism moves the first and second doublets simultaneously and in the same direction throughout the zoom range so that the doublets vary the magnification without varying the image position.

7. A device as claimed in claim 6, wherein the movable lens of the focusing lens group comprises a positive lens with an effective focal length of 16.93 mm, wherein the fixed lens of the focusing lens group comprises a negative lens with an effective focal length of −10.58 mm, wherein the first lens group has an effective focal length of 39.16 mm, and wherein the second lens group has an effective focal length of 50.42 mm.

8. The device of claim 6, wherein the first and the second lens groups and the focusing lens group comprises no more than six optical elements.

9. An adapter for coupling a video camera with an endoscope to record images from within a patient body, the adapter comprising:

a clamp adapted to attach the adapter to the endoscope;

a mount adapted to attach the adapter to the video camera;

a focusing lens group including movable and fixed lenses disposed in an optical path from the clamp to the mount, at least one of the lenses being negative, and a focus mechanism coupled to the movable lens so as to move the movable lens to vary the object distance;

a first lens group disposed in the optical path from the focus system;

a second lens group disposed in the optical path from the first lens group;

a zoom mechanism coupled to the first and second lens groups and adapted to move the lens groups along the optical path simultaneously and in the same direction to vary magnification of the images without varying the object distance;

wherein the first and second lens groups comprise positive cemented doublets;

wherein the zoom mechanism comprises a tubular body disposed about the optical path, the body having first and seconds slots, a first pin coupled to the first lens group and engaging the first slot so that the first slot repositions the first lens group when the body rotates, and a second pin coupled to the second lens group and engaging the second slot so that the second slot repositions the second lens group when the body rotates; and wherein the optical path between the clamp and the mount includes no more than six non-planer optical elements.

10. An adapter as claimed in claim 9, further comprising a centering mechanism coupled to at least one of the mount and the clamp, the centering mechanism adapted to displace the optical path laterally to center the image on a camera sensor.

11. An adapter as claimed in claim 9, wherein the optical path between the clamp and the mount is substantially composed of the positive doublets of the first and second lens groups, the fixed and movable lenses of the focusing lens group, and one or more windows.

12. An adapter for coupling a video camera to an endoscope, the adapter comprising:

a body defining two opposed ends and an optical path extending between the ends and through which an optical image can be passed;

a zoom lens group consisting of first and second positive lens groups mounted within the body to be displaceable so as to vary magnification of the image;

a focusing lens group consisting of a positivelens and a negative lens, the positive and the negative lens being mounted within the body so that one of the lenses is movable relative to the other so as to focus the image; and wherein the negative lens of the focusing lens group is fixed, and wherein the positive lens is movable relative to the negative lens so as to focus the image.

13. The adapter of claim 12, wherein the first and the second positive lens groups each consist of a cemented doublets.

14. The device of claim 13, wherein each of the cemented doublets include a positive and a negative optical element cemented together.

* * * * *